United States Patent
Holicki et al.

(10) Patent No.: US 9,816,786 B2
(45) Date of Patent: Nov. 14, 2017

(54) METHOD FOR AUTOMATICALLY GENERATING A THREE-DIMENSIONAL REFERENCE MODEL AS TERRAIN INFORMATION FOR AN IMAGING DEVICE

(75) Inventors: Michael Holicki, Munich (DE);
Nikolaus Schweyer, Munich (DE);
Johannes Speth, Munich (DE);
Juergen Zoz, Friedberg (DE)

(73) Assignee: MBDA Deutschland GmbH, Schrobenhausen (DE)

( * ) Notice: Subject to any disclaimer, the term of this patent is extended or adjusted under 35 U.S.C. 154(b) by 1314 days.

(21) Appl. No.: 13/091,703

(22) Filed: Apr. 21, 2011

(65) Prior Publication Data
US 2011/0261162 A1 Oct. 27, 2011

(30) Foreign Application Priority Data
Apr. 24, 2010 (DE) .................. 10 2010 018 144

(51) Int. Cl.
*H04N 13/02* (2006.01)
*F41G 7/22* (2006.01)
(Continued)

(52) U.S. Cl.
CPC ......... *F41G 7/2226* (2013.01); *F41G 7/2253* (2013.01); *F41G 7/2293* (2013.01); *G01S 3/7865* (2013.01); *G06T 17/05* (2013.01)

(58) Field of Classification Search
CPC .... F41G 7/2226; F41G 7/2253; F41G 7/2293; G06T 17/05; G01S 3/7865
(Continued)

(56) References Cited

U.S. PATENT DOCUMENTS

| | | | |
|---|---|---|---|
| 8,306,273 B1 * | 11/2012 | Gravseth et al. | 382/106 |
| 2002/0004710 A1 * | 1/2002 | Murao | 702/167 |

(Continued)

FOREIGN PATENT DOCUMENTS

| | | |
|---|---|---|
| EP | 2 060 873 A2 | 5/2009 |
| WO | WO 98/30860 A2 | 7/1998 |

OTHER PUBLICATIONS

European Search Report issued in European counterpart application No. EP 11002851.1-1248 dated Aug. 26, 2011, with Statement of Relevancy (Seven (7) pages).
(Continued)

*Primary Examiner* — Jared Walker
(74) *Attorney, Agent, or Firm* — Crowell & Moring LLP

(57) ABSTRACT

A method for automatically generating a three-dimensional reference model as terrain information for a seeker head of an unmanned missile. A three-dimensional terrain model formed from model elements obtained with the aid of satellite and/or aerial reconnaissance is provided. Position data of the imaging device at least at one planned position and a direction vector from the planned position of the imaging device to a predetermined target point in the three-dimensional terrain model are provided. A three-dimensional reference model of the three dimensional terrain model is generated that incorporates only those model elements and sections of model elements from the terrain model, which in the viewing direction of the direction vector from the planned position of the imaging device, are not covered by other model elements and/or are not located outside the field of view of the imaging device.

7 Claims, 1 Drawing Sheet

(51) Int. Cl.
*G01S 3/786* (2006.01)
*G06T 17/05* (2011.01)
(58) Field of Classification Search
USPC .......... 348/46, 113, 117, 135; 382/103, 106, 382/154; 701/400
See application file for complete search history.

(56) References Cited

U.S. PATENT DOCUMENTS

| | | | |
|---|---|---|---|
| 2004/0105573 A1* | 6/2004 | Neumann et al. | 382/103 |
| 2005/0182528 A1* | 8/2005 | Dwyer et al. | 701/3 |
| 2005/0183569 A1* | 8/2005 | Solomon | 89/1.11 |
| 2005/0271248 A1* | 12/2005 | Teku et al. | 382/103 |
| 2006/0120590 A1* | 6/2006 | Han et al. | 382/154 |
| 2009/0087029 A1* | 4/2009 | Coleman et al. | 382/103 |

OTHER PUBLICATIONS

German Office Action issued in German counterpart application No. 10 2010 018 144.7-53 dated Sep. 30, 2010 (Six (6) pages).
Christy, S. et al., "Terminal Air-to-Ground Missile Guidance by Infrared Seeker", Proceedings of SPIE vol. 3086, XP002076459, Apr. 23, 1997. (Eleven (11) total pages).
Engh, C. H., "A See-Ability Metric to Improve Mini Unmanned Aerial Vehicle Operator Awareness Using Video Georegistered to Terrain Models", Master thesis, Brigham Young University, Proco, Utah, Dec. 2008. (One-Hundred and Sixteen (116) total pages).
Gruen, A., "Semi-Automated Approaches to Site Recording and Modeling", International Archives of Photogrammetry and Remote Sensing, vol. XXXIII, Part B5, Amsterdam Jul. 16-23, 2000, pp. 309-318. (Eleven (11) total pages).
Havemann, S. et al., "New Approaches to Efficient Rendering of Complex Reconstructed Environments", VAST 2003, pp. 1-8. (Eight (8) total pages).
Niederoest, M., "Detection and Reconstruction of Buildings for Automatic Map Updating", Dissertation, ETH No. 14909, Swiss Federal Institute of Technology Zurich, 2003. (One-Hundred and Fifty-Five (155) total pages).
Nurminen, A., "m-LOMA—a Mobile 3D City Map", Web3D 2006, Columbia, Maryland, Apr. 18-21, 2006, the Association for Computing Machinery, Inc., pp. 7-18. (Thirteen (13) total pages).
Royan, J., "Network-Based Visualization of 3D Landscapes and City Models", Real-Time Interaction with Complex Models, IEEE Computer Society, vol. 27, Nov./Dec. 2007, pp. 70-79. (Ten (10) total pages).

* cited by examiner

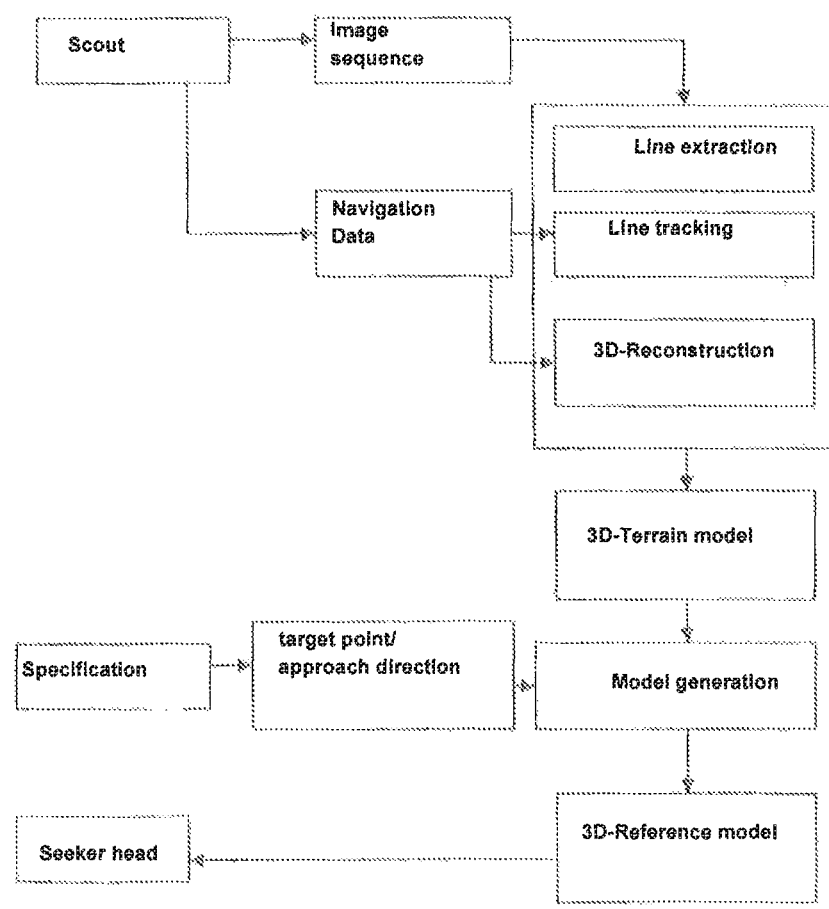

METHOD FOR AUTOMATICALLY GENERATING A THREE-DIMENSIONAL REFERENCE MODEL AS TERRAIN INFORMATION FOR AN IMAGING DEVICE

CROSS REFERENCE TO RELATED APPLICATIONS

This application claims priority under 35 U.S.C. §119 to German Patent Application No. 10 2010 018 144.7, filed Apr. 24, 2010, the entire disclosure of which is herein expressly incorporated by reference.

BACKGROUND AND SUMMARY OF THE INVENTION

Exemplary embodiments of the present invention relate to a method for automatically generating a three-dimensional reference model as terrain information for an imaging device with a predetermined field of view, in particular for a seeker head of an unmanned missile equipped with a camera.

Modern missile systems frequently use models of a target for target recognition and target tracking. These models represent a description of the target structure and optionally the target environment, and are generated before deployment in a mission planning. To allow flexible selection of the approach profiles and to ensure a high strike accuracy, these models must also define the three-dimensional structure of the target and the target environment.

Practice has shown that the two-dimensional structure of the target and the target environment in the horizontal dimension can be obtained accurately from aerial photographs and satellite images, but that it is often difficult to obtain good and sufficient information on the height structure. Often only imprecise and roughly scanned height data are available for the terrain, so that height values have to be interpreted over large intervals compared to target dimensions. Such data are often missing for buildings, bridges and the like as three-dimensional target objects on the terrain, and therefore have to be estimated. Errors occurring in this estimate have a negative effect on strike accuracy and thus on the success of a mission. It is therefore desirable to have methods available that generate good and reliable three-dimensional information from reconnaissance data.

European Patent Document No. EP 2 060 873 A2 discloses a method for line-based three-dimensional reconstruction of terrain data from image sequences, which were taken with an image capturing device of a missile. In this method, two-dimensional line segments are extracted from the individual images, tracked via the image sequence, and three-dimensional line segments are then established from the tracks of the line segments and the navigation data of the reconnaissance platform. In addition to the line segments, intersection points of such segments are also taken into consideration. The result is a wire-frame model of a scene, composed of three-dimensional line segments and topological information about intersections of segments of this type. Furthermore, for each object established thereby, an estimate of accuracy is carried out in the form of a covariance matrix for the parameters involved. This method had not yet been used to produce reference models for missile missions.

With prior methods used for defining a target object for missile missions, a processor has had to manually extract two-dimensional lines of the target structure from a two-dimensional original, for example, an air reconnaissance photograph, and individually provide them with additional height data.

DESCRIPTION OF THE INVENTION

Exemplary embodiments of the present invention provide automatic generation of the three-dimensional reference model without additional manual processing of height data.

This method according to the invention for automatically generating a three-dimensional reference model as terrain information for an imaging device, which in particular is suitable for a seeker head of an unmanned missile, has the following steps:

a) Provision of a three-dimensional terrain model formed from model elements, which has been obtained, for example, with the aid of satellite and/or aerial reconnaissance;

b) Specification of position data of the imaging device at least at one planned position as well as a direction vector from the planned position of the imaging device to a predetermined target point in the three-dimensional terrain model;

c) Generation of a three-dimensional reference model of the three dimensional terrain model, wherein only those model elements and sections of model elements from the terrain model are incorporated into the reference model, which in the viewing direction of the direction vector from the planned position of the imaging device are not covered by other model elements and are not located outside the field of view of the imaging device.

The generation of the three-dimensional reference model according to the invention supplies an element model of the target object and of the environment thereof containing fewer data than the original terrain model. Model elements not visible for the respective position of the imaging device are no longer contained in the reference model. The reference model thus contains only those model elements that are visible with a three-dimensional view, which is captured by an imaging device located at the planned position in the direction of the viewing direction vector. This makes it possible to directly compare an image captured by the imaging device to the generated three-dimensional reference model and, by matching the model elements with corresponding contours in the image, to carry out an identification of the target object. To generate the reference model, only those model elements and sections of model elements are used that are not covered by other model elements in the viewing direction of the direction vector from the planned position of the imaging device. This avoids unnecessary memory and computing time being used for model elements that are not discernible in the current view anyway, for example, lines and intersection points. A check is performed for each model element as to whether, from the selected approach direction (i.e., in the direction of the viewing direction vector), the model element lies in the field of view of the imaging device located at the planned position (for example, a flight path) and whether it is visible, that is, not covered by any other model elements. According to the invention, model elements that are not visible or that are covered are disregarded in further calculation. The calculation is thereby simplified and also the amount of data that have to be transmitted to the imaging device, for example, to the seeker head of an unmanned missile, is substantially reduced by the invention, because only the data of the reference model, and not the more extensive data of the terrain model, have to be transmitted.

Accuracy information can be respectively assigned to the model elements of the three-dimensional terrain model, which information reflects the position accuracy of the respective model element, and elements with a better accuracy can be used in the generation of the three-dimensional reference model, and model elements with poorer accuracy are not incorporated into the reference model. Employing model elements with a higher accuracy, in particular regarding their height information, increases the accuracy of the information of the reference model considerably. If the information of the reference model, that is, e.g., the lines and intersection points, is compared to the image captured by the imaging device and the structures discernible therein, the use of model elements with better accuracy leads more quickly to a qualitatively high-grade matching of the reference model with the captured image.

A further aspect of the method according to the invention is also advantageous in which the model elements provided for incorporation into the reference model are examined for whether, in the viewing direction of the direction vector from the planned position of the imaging device, they form structures that can be confused. Model elements of this type can lead to an increased inaccuracy in the assignment to the image captured by the imaging device and are therefore not incorporated into the reference model, or incorporated only with a lower priority.

Neighborhood analysis for the respective model element can be performed before the selection of a model element for the generation of the reference model, in which neighborhood analysis it is verified whether for the respective model element similar model elements are present in a predetermined environment to the respective model element and then, if a similar model element has been detected in the predetermined environment in the neighborhood analysis, the respective image element is not incorporated into the reference model or incorporated only with low accuracy information. Using neighborhood analyses of this type, similar structures present in the predetermined environment, for example, repeating structures, are recognized. These could lead to confusion in the matching of the image captured by the imaging device to the reference model and thus also to incorrect position assumptions. Such model elements similar to one another can be incorporated into the reference model when they are used to increase the precision of the reference model and when the risk of confusion when matching the reference model with the image captured can be disregarded.

Groups of similar model elements ascertained in the neighborhood analysis can be incorporated into the reference model completely or not at all.

The model elements have lines and intersection points of lines, as well as areas delimited by the lines.

The lines reflect contour edges of objects that are present in the reality depicted by the three-dimensional terrain model.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is explained in more detail below based on an example with reference to the drawing; which shows:

FIG. 1 A flow chart of the entire sequence of a method according to the invention.

DETAILED DESCRIPTION OF THE DRAWINGS

FIG. 1 as a flow chart shows the method according to the invention for generating a three-dimensional reference model as terrain information for an imaging device.

Initially, a plurality of images of the target region is captured in a chronologically sequential manner by a scout, for example, by a satellite, a reconnaissance aircraft or a reconnaissance drone. These image sequences are then fed to a computer device, in which lines and intersection points of lines resulting therefrom are extracted from the individual images using suitable mathematical line extraction methods. The current navigation data of the scout at the time the image was captured are assigned to each of the individual images.

The lines extracted in the individual images are then tracked over the image sequence so that a three-dimensional linear course of each extracted line results. This three-dimensional reconstruction from individual two-dimensional images over the chronological course of the movement of the scout then produces a three-dimensional terrain model, which is composed of model elements, namely in this case of lines, points of intersection of lines and optionally of areas delimited by lines.

A three-dimensional reference model is generated from the three-dimensional terrain model so that this three-dimensional terrain model can now be used in a seeker head of an approaching missile or, for example, also in the target device of an approaching helicopter, so that a comparison of an image captured by an imaging device of the seeker head to the terrain model can be performed, and so that the seeker head can localize its target reliably and with a high degree of accuracy. The target point and the approach direction, that is the viewing direction of the imaging device on the target point, are predetermined thereby. Thus, the target point and the planned position of the imaging device, that is, for example, of the missile or of the helicopter, determine the direction vector of the approach direction. The reference model is thus produced for a point in time at which, for example, a missile provided with the imaging device is located at the planned position.

It is expedient if the determined three-dimensional terrain model is adapted to the specified physical and algorithmic properties of the seeker head of the missile used. From these properties, requirements regarding the complexity and the precision of a reference model, as well as regarding visibility, accuracy and distinctiveness of individual structures in the model can be derived, so that the seeker head can localize its target reliably and with a high degree of accuracy. The aim of the model generation is to extract a reference model from the available three-dimensional terrain model, which is optimal with respect to the requirements for the seeker head used with the predetermined target point and the predetermined approach direction.

The algorithmic complexity of the matching or tracking method implemented in the seeker head is determined by the number of model elements (in this case, for example, lines or intersection points of lines). For the real-time capability of the target tracker provided in the seeker head, the number of model elements is limited to a maximum number of model elements specific to the seeker head, which the reference model must not exceed. It should be ensured in the generation of the model that this limit specific to the seeker head is not exceeded. A minimization of the model elements contained in the reference model is therefore desirable.

The elements of the reference model are selected such that, during the approach by the missile to the target from the selected approach direction, they render possible an optimal estimate of the position and location of the missile by the localization algorithm operating in the computer of the seeker head.

The formation of the reference model can be carried out in four selection steps, in which the respectively determined model elements (for example, lines, areas or intersection points of lines) are selected from the original terrain model for incorporation in the reference model.

In the first selection step, a selection is made according to visibility. All model elements are thereby discarded which, seen from the perspective of the approaching missile, are not in the field of view of the seeker head or are covered by other objects of the terrain model.

In a second selection step, a selection is made according to accuracy. The accuracy measurements of the model elements remaining after the first selection step are used to calculate the accuracy of the projections of these model elements in the approach perspective of the missile. Model elements that are too inaccurate are discarded. The above-mentioned covariance matrices, which can be assigned to each model element, are used thereby to judge the accuracy.

In a third selection step, a selection is made according to distinctness. The line segments remaining after the first two selection steps are then examined as to whether they form structures that can be confused in the projection, for example, groups of parallel lines with a close spacing. Structures of this type are either incorporated entirely, if they are composed of a few lines (for example, the two edges of a street) or they are completely discarded if they are composed of a large number of lines (for example, a plurality of parallel field furrows). This also prevents only a part of a structure of this type from being incorporated in the next selection step.

Finally, in a fourth selection step, a selection is made according to precision of the model elements. By matching these lines in a comparison with lines that are extracted from an image obtained by the imaging device, it can be determined for each group of model elements using error computation how accurately the position and location of the imaging device, that is, for example, of the seeker head of a missile, can be determined. The group of lines remaining after the third selection step is finally incorporated into the reference model in which this localization is carried out with maximum accuracy. Lines can be incorporated in many different directions into the reference model.

If the model generation is performed while taking these framework conditions into consideration, the simplest possible yet meaningful three-dimensional reference model is provided, which is optimally adapted to the physical properties of the seeker head and to the requirements of the algorithms operating in the computer of the seeker head for finding and tracking the reference structure describing the target in the image generated by the imaging device of the seeker head, as well as for estimating the relative position and location of the missile.

After the three-dimensional reference model has been generated, it is transmitted to the computer of the seeker head. During an approach, the three dimensional reference model is matched to the image captured by the imaging device in order to determine the position of the missile relative to the target and thus to strike the target reliably.

The method according to the invention thus requires as input data a three-dimensional terrain model, which is composed of three-dimensional model elements (for example, line segments and optionally also other three-dimensional primitives, such as areas, for example). Accuracy measurements in the form of covariance matrices can exist for the individual model elements. Furthermore, as input variables for carrying out the method according to the invention, a planned target point, a planned approach direction and the sensor characteristics of the imaging device, for example, a seeker head of a missile, are required.

From these input data, the method according to the invention provides a reference model as a subset of the three-dimensional model elements from the original three-dimensional terrain model.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically generating a three-dimensional reference model as terrain information for a seeker head of an unmanned missile with a predetermined field of view comprising the steps:
   a) providing a three-dimensional terrain model formed from model elements, which has been obtained using satellite and/or aerial reconnaissance;
   b) specifying position data of the imaging device at least at one planned position and a direction vector from the planned position of the imaging device to a predetermined target point in the three-dimensional terrain model;
   c) generating a three-dimensional reference model of the three dimensional terrain model, wherein only model elements and sections of model elements from the terrain model are incorporated into the reference model that, in a viewing direction of the direction vector from the planned position of the imaging device, are not covered by other model elements or are not located outside a field of view of the imaging device, wherein accuracy information reflecting position accuracy of a respective model element is respectively assigned to the model elements of the three-dimensional terrain model, and
   model elements with a better accuracy are used in the generation of the three-dimensional reference model, and model elements with poorer accuracy are not incorporated into the reference model.

2. The method according to claim 1, wherein the model elements provided for incorporation into the reference model are examined for whether, in the viewing direction of the direction vector from the planned position of the imaging device, they form structures that are indistinct.

3. The method according to claim 2, wherein
   a neighborhood analysis for a respective model element is performed before the selection of a model element for the generation of the reference model, in which neighborhood analysis it is verified whether, for the respective model element, similar model elements are present in a predetermined environment to the respective model element, and
   then, if a similar model element has been detected in the predetermined environment in the neighborhood analysis, the respective image element is not incorporated into the reference model or incorporated only with low accuracy information.

4. The method according to claim 3, wherein groups of similar model elements ascertained in the neighborhood analysis are incorporated into the reference model either completely or not at all.

5. The method according to claim 1, wherein
to verify accuracy of a detected reference model, initially at least one group of model elements is selected, and it is then determined for this group the accuracy with which the position of the imaging device can be determined by pattern comparison of this group of model elements with model elements extracted from an image captured by the imaging device, and
only model elements of those groups of model elements are incorporated into the reference model in which the aforementioned position determination is carried out with an accuracy that lies above a predetermined threshold value.

6. The method according to claim 1, wherein the model elements have lines, intersection points of lines and areas delimited by lines.

7. The method according to claim 6, wherein the lines reflect contour edges of objects present in an actual scene depicted by the three-dimensional terrain model.

* * * * *